Dec. 19, 1967 W. T. DAVIS 3,359,292
TRANSALKYLATION OF ALUMINUM ALKYLS
Filed Feb. 28, 1964

United States Patent Office 3,359,292
Patented Dec. 19, 1967

3,359,292
TRANSALKYLATION OF ALUMINUM ALKYLS
Wayne T. Davis, Baton Rouge, La., assignor to Ethyl Corporation, New York, N.Y., a corporation of Virginia
Filed Feb. 28, 1964, Ser. No. 348,126
9 Claims. (Cl. 260—448)

ABSTRACT OF THE DISCLOSURE

The exchange of alkyl groups by reaction of trialkyl aluminum compounds and olefins under closely controlled conditions based on high temperature and short contact time which enhances the rates of the desired reactions relative to the rates of undesired side reactions.

Figure 1:
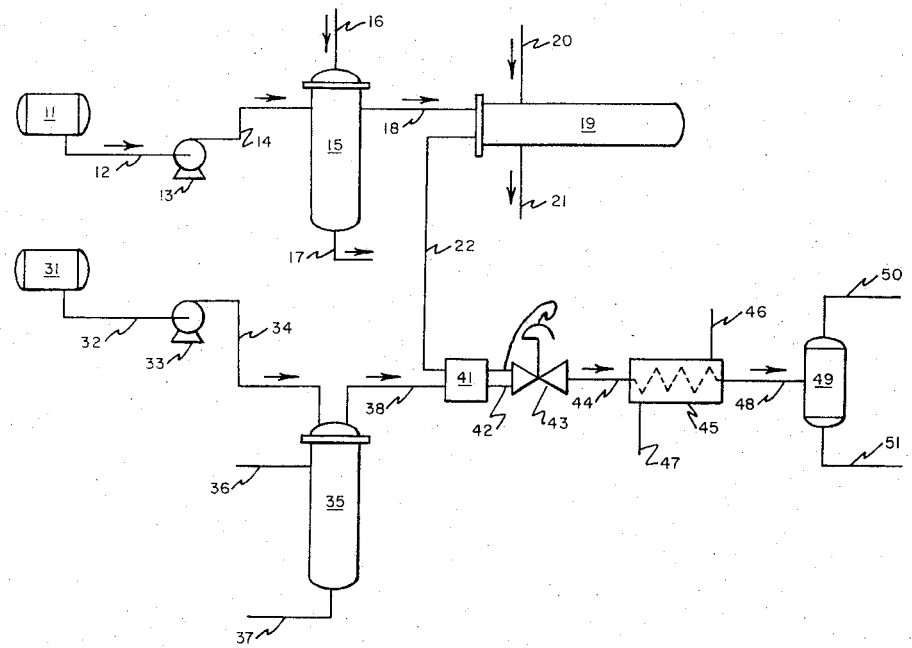

This invention relates to the manufacture or processing of alkyl aluminum compounds. More particularly, the invention relates to the exchange of alkyl groups of compounds such as trialkyl aluminum and dialkyl aluminum hydride for a new alkyl group corresponding to an olefin reactant, this type of reaction being frequently referred to as displacement, or trans-alkylation.

It has been known for some time that the alkyl groups of trialkyl aluminum compounds or dialkyl aluminum hydride compounds can be, in effect, replaced by new alkyl groups corresponding to olefin reactants, particularly when the olefins are of the normal primary type. It is known that such a reaction will occur, at the appropriate conditions, for both the exchange of a low alkyl group and replacement by a high alkyl group, or for the converse reaction, the exchange of a high alkyl group by a low alkyl group. By low and high herein is meant the relative chain length of an olefin or an alkyl group, viz, the number of carbon atoms in the compound or the radical. Illustratively, an example of the first type of reaction is the replacement of a hexyl group by 1-decene, resulting in a decyl aluminum group and free hexene. An illustration of the latter type of reaction is the release of, for example, dodecene from a dodecyl aluminum moiety or group of butylene, and the formation of an n-butyl radical associated with the aluminum.

Despite the fact that these transalkylations have been known, no highly effective commercial process has heretofore been provided. Most frequently, the use of a catalyst is suggested to aid in these displacement processes, finely subdivided nickel being a particularly preferred catalyst. A non-catalytic technique which has been disclosed is described in British Patent 908,032 to Karl Ziegler. According to said British patent an aluminum alkyl is mixed with an excess of an olefin of 2 to 8 carbon atoms. Said mixtures were then heated for a period of 0.5 to 10 seconds, to a temperature of 392° to 572° F. (200° to 300° C.), preferably 482° to 518° F. (250° to 270° C.). The apparatus employed for heating and processing the mixture according to the British patent uses a reaction tube of less than 0.2 in. inside diameter, with a total length of about 59 feet. About 42 feet of said reactor comprise the reaction section, so that the length: internal diameter ratio of the reactor was about 210:1.

In general, particular problems encountered in prior methods of conducting displacement operations have been the unfortunate tendency for side reactions to occur which lower yields, and thereby reduce efficiency. These occur both in catalytic and non-catalytic processes and are evidenced by the formation of branched olefins and alkyl groups and/or internal olefins, to an objectionable degree. These problems exist both in non-catalytic and catalytic processes. With respect to the process described in the British patent above mentioned, it is apparently confined to the use of olefin reactants of eight carbon atoms or less, rather than being applicable to utilizing higher olefins. In addition, as noted, the reaction is conducted in an extremely long and narrow reaction tube, so that commercial scale equipment is difficult to design and operate. One particular weakness of this prior method is the tendency for deposition of metallic aluminum to occur on the heated wall of the reactor, rapidly leading to pluggage and similar difficulties.

An object of the present invention is to provide a new and novel displacement reaction technique. A further object is to provide a displacement type process wherein particularly high and efficient directed reaction is achieved, and the formation of branched chain vinylidene olefins by side reactions is minimized. A further object of preferred embodiments of the invention is to provide an essentially non-catalytic displacement process particularly applicable to utilizing and reacting olefin streams of ten or more carbon atoms. Another object is to provide a transalkylation process wherein pluggage by aluminum metal deposition is minimized. Other objects will appear hereinafter.

The present invention in its most general form involves preheating a displacement olefin stream to a relatively high temperature, at least a sufficient temperature to provide substantially all the heat for a desired displacement process. The olefins thus preheated are then mixed with an alkyl aluminum feed stream to be processed, under high intensity agitation conditions, to be illustrated more fully hereinafter, and immediately the thus mixed reactants are reacted for a relatively brief period, and under adiabatic or substantially adiabatic reaction conditions. The total time, from the first contact of the highly heated olefin and the alkyl aluminum feed, to the termination of reaction is quite brief, being only from about one-tenth up to the range of about five seconds, and desirably 0.1 to 1 second, a highly preferred range being about 0.2 to 0.5 second. After this brief reaction period, the reactant mixture is very rapidly cooled to a temperature such that further reaction is essentially minimized or stopped.

Figure 2:
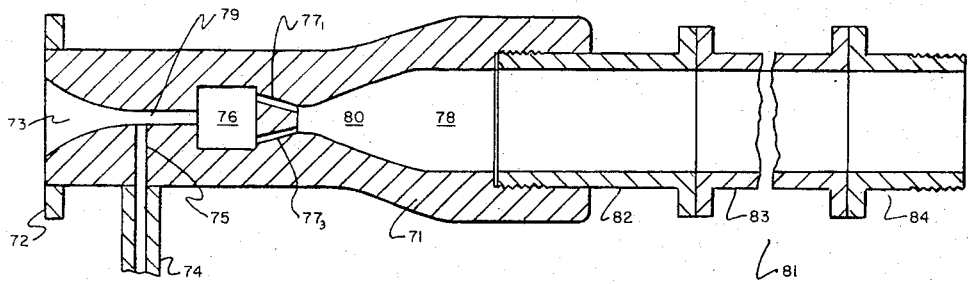

A full understanding of the invention and of the several modes of its application will be clear from the more detailed description following, and from the examples and the figures. The figures include:

FIG. 1, a schematic illustration of an operating installation for carrying out the process, and FIG. 2, a cross sectional view of a typical mixing apparatus for the intensive mixing of the hot olefin feed stream with the relatively cold alkyl aluminum feed.

In the description and examples herein, the term "alkyl aluminum compounds, or trialkyl aluminum" is meant to include trialkyl aluminum compounds, and also dialkyl aluminum hydrides. In many cases, alkyl aluminum feed mixtures, referred to as trialkyl aluminum, will contain minor but appreciable quantities of dialkyl aluminum hydrides as impurities, and the alkyl groups thereof of these particular components are equally susceptible to replacement according to the present process.

It is frequently desirable to consider the grouping "alR" to represent an aluminum fragment with one alkyl group attached thereto. This symbol refers to a moiety having one-third atomic equivalent of aluminum.

The term "vinyl olefin," sometimes used herein, refers to straight chain, primary olefins such as 1-hexene, 1-octene, and others. The term "vinylidene olefins" also sometimes used herein, refers to beta branched alpha olefins, e.g., isobutylene, 2 - propyl-1-pentene, 2-amyl-1-heptene, and similar olefins having two alkyl groups attached to the beta carbon atom of a terminal olefin linkage.

Illustrative processes or feed stocks to which the present invention is applicable include the reaction of beta branched alkyl aluminum compounds with normal alpha olefins, such as the reaction of triisobutyl aluminum and n-hexene, or with mixtures of olefins of different chain length predominating in normal 1-alkenes. The alkyl aluminum feed can be a pure component, as in the case of a feed consisting of pure triisobutyl aluminum, tri-n-propyl aluminum, tri-decyl aluminum, triethyl aluminum, or the like, but most frequently, the alkyl aluminum feed mixture to a displacement reaction will be a system wherein the alkyl groups exhibit a wide range in identity and concentration of groups, particularly when such feeds are derived from preceding chemical reactions of one sort or another. Thus, the feed to a reaction embodying the present invention can be statistical distribution of alkyl aluminum compounds centering at octyl radicals, but including appreciable quantities of hexyl, butyl, decyl, and dodecyl, and the displacing olefins may then be a mixture of normal alpha olefins predominating in olefins of twelve to fourteen carbon atoms. Another type of embodiment utilizes the higher alkyl aluminum feeds, for example, a feed wherein the maximum molar concentration is the decyl and dodecyl alkyl aluminum moieties, and the displacing olefin is a mixture of relatively low molecular weight olefins, centering or peaking at the hexene and octene olefin range.

A vital and essential feature of the process in all its forms is the intensive preheating of the olefins above the desired reaction temperature. Olefins uncontaminated by metal compounds can be readily heated to such levels with only little cracking or by-product formation, ani without significant coking in the heating zone. The desired temperature levels will vary appreciably with other factors, and with the character of the alkyl aluminum feed to the process. In substantially all cases, the olefin supply stream is heated to a temperature of above 400° F. and up to temperatures approaching 700° F. When processing feeds of normal alkyl aluminum groups, preferred temperatures will be 500 to 650° F., a particularly preferred temperature being about 600 to 650° F., but when beta branched alkyl aluminum groups are being processed, pre-heating of the olefins to only about 400 to 500° F. will be usually enough. It must be appreciated that the foregoing temperatures are not critically limiting as the precise degree of preheating needed is also affected in part by the proportions of olefins to be used and the reaction times employed. As previously indicated, the basic feature of the process is mixing hot olefins with relatively cold alkyl aluminum feed in proportions such that the mixture is provided at the necessary reaction temperatures and that essentially no external heat is supplied during the reaction period. Hence, it will be clear that when using a relatively low olefin-alkyl ratio, that the olefins will necessarily be heated somewhat higher for a given degree of reaction, than in the case when an appreciably higher olefin alkyl ratio is used, in which case a somewhat lower preheating temperature can be supplied to the olefins.

The olefins and alkyl aluminum supplies are mixed under very high intensity mixing conditions for a fraction of the time of the reaction period. Various techniques are applicable in high intensity mixing. One type of mixing is to introduce the alkyl aluminum stream to the high olefins stream at essentially a right angle and at relatively high velocities. Thus, the trialkyl aluminum feed in such instances is injected through small feed ports at right angles into the boundary of stream of hot olefins supply. This initial introduction is immediately followed by a zone of enlarging cross sectional area, which, in addition to reducing the velocity provides thereby a substantial degree of turbulence and mixing. An alternative mixer involves the feeding together of the two streams, viz., the alkyl aluminum feed and the hot olefins, at right angles, as in the branches of a T, and the egress of the thus formed mixture through the stem of the T arrangement, and in a series of constricting orifices therein.

The mixing apparatus used is immediately adjacent and can almost be considered an initial portion of the reaction zone. The mixing apparatus is so provided that it retains or has retained therein the feed streams for a fraction of the time in the subsequent reaction zone which is an elongated tube arrangement, such that the residence time of the hot reacting materials therein is as low as one-tenth of a second up to several seconds. The fractional residence time in the mixing zone can be from as low as one-hundredth and up to about one-half of the residence time in the reaction zone extension. Actually, continuation of the mixing, in various degree of intensity, throughout the reaction zone is entirely permissive, but the mixing in the latter segment will not significantly be of benefit. The high intensity mixing concurrently with contact of the hot olefins and the aluminum alkyl is essential for the purposes of the invention.

The temperatures of operation of the reaction zone segment will, as indicated with respect to the mixing, vary, but will usually be from 300 to about 650° F., the most common range being from 500 to 600° F., for systems wherein the alkyl aluminum feed is a mixture of trialkyl aluminum components and the olefin reactant is similarly a mixture of olefin concentrated in the desired ranges. An even more preferred average reaction temperature for these situations is about 550 to 600° F. In the case of processing alkyl aluminum compounds wherein the alkyl groups are beta branched radicals, such as triisobutyl aluminum, tri (2-methyl butyl) aluminum and the like, reaction temperatures of the order of 400 to 500° are much more common and preferred.

The mixing and reactions of the process are carried out with both streams substantially or at least in part in liquid phase, maintained by the operating pressure. Operating pressures will be from 100 to 800 pounds per square inch, but a preferred range is from about 100 to 600 pounds per square inch.

The very rapid cooling of the effluent from the reaction zone to a temperature at which reaction is essentially terminated is a vital feature of the process and various techniques are available for this purpose. One particularly effective procedure for giving this rapid cooling is to discharge the effluent from the reaction zone, at a relatively high pressure, into a zone of low pressure below 100 pounds per square inch whereby a substantial degree of flashing or partial vaporization occurs and the average temperature of the liquid phase is reduced. A high efficiency heat exchanger can be used to provide the desired cooling, or an indirect heat exchanger as indicated can be used in supplement to the flashing operation described. An additional effective method of lowering the reacting temperature to non-reactive conditions involves quenching the effluent from the reaction zone with a cool hydrocarbon. As a special form of this technique the cool hydrocarbon is a portion of an olefin stream corresponding to the olefin used as the hot reacting stream to the displacement reaction zone, or similarly, a different olefin stream. Alternatively, an inert hydrocarbon, such as a mixture of paraffin hydrocarbons of appropriate volatility, can be used for quenching purposes, but this latter has the disadvantage of introducing a foreign diluent in the reacting mixture. A reduction of the temperature of about at least 30° and preferably at least about 50° F. below the reaction temperature is provided to substantially terminate further reaction. Even more effectively, the cooling operation will lower the temperature to below 300° F. in a period of several seconds. In one particular and highly effective form of cooling and treating, the effluent from the reaction zone is intimately mixed with an aluminum alkoxide stream wherein the alkoxide groups are in excess of one per atom of aluminum. Most efficiently, this stream is supplied in proportions such that sufficient alkoxide groups are introduced to account for at least one alkoxide group per aluminum atom of the resultant mixture. By providing such a cooled liquid stream to react with the reactor effluent, it is found that the alkyl aluminum components immediately react with the alkyl aluminum alkoxide mentioned, so that the net mixture is at least an alkyl aluminum alkoxide, i.e. having at least one alkoxide group for each atom of aluminum present. This operation is beneficial with respect to not only termination of the reaction, but also with respect to subsequent separation of converted and released olefin hydrocarbons from the organoaluminum components therein.

Description of the typical process installation and of specific apparatus, shown in the figures, follows.

Referring to FIG. 1, a schematic illustration of a plant installation, including ancillary equipment, for utilizing the process is shown. The principal units of apparatus include a mixer 41 and a reactor section 42. Olefin storage is provided by a drum or tank 11, connected by a transfer line 12 to the olefin pressurizing pump 13. The pressurized olefin is delivered through line 14 to a first olefin heater 15, supplied by a line 16 with steam or other heating medium, which is discharged through line 17. Initially heated olefin passes through line 18 to the final heater 19. A heating medium is supplied through line 20 and discharged through line 21. The thus heated olefin passes through feed line 22 to the mixer-reactor sequence.

A similar layout is provided for the alkyl aluminum feed. From an alkyl aluminum feed drum 31, the alkyl aluminum passes through line 32 to pressurizing pump 33, which discharges through a line 34 to an alkyl aluminum warmer 35. As previously discussed, the alkyl aluminum is relatively cool upon being exposed to reaction conditions, but when desired a minor quantity of heat can be applied to the alkyl aluminum and hence a heater 35 is thus frequently used. The aluminum alkyl should not be heated to more than about 250° F., and preferably, not above 200° F. Feed line 36 and discharge line 37 provide for circulation of the heating medium. The alkyl aluminum passes through line 38 to the mixer 41 of the mixer reactor sequence.

Upon passing through the mixer 41 and reactor 42, the treated or reacted mixture passes through a pressure reduction valve 43, thence a line 44 to a quench cooler 45, wherein the heated mixture, now at appreciably lower pressures, is cooled by the circulation of an appropriate coolant, through line 47 and out through line 46.

The cooled reaction mixture products pass through discharge line 48 to a flash chamber 49, the overhead line 50 being provided for discharge of vapors therefrom, and the bottoms line 51 being provided for a discharge of liquid phase.

In all cases a high intensity mixing device or apparatus is required, as indicated by 41 of FIG. 1. The precise detail of a mixing apparatus can vary greatly, as is discussed herein. A typical and highly effective high intensity mixer is shown in cross section in FIG. 2.

Referring to FIG. 2, a mixer body 71 is shown in attachment to a reactor section assembly 81. The mixer body is machined of solid bar stock of steel. A hot olefin feed zone 73 receives hot olefin from a transfer line, and is a converging throat. The mixer body 71 is attached to the transfer line, not shown, by a flanged connection mating with the flange 72 at the end of the mixer body 71.

An aluminum alkyl feed line 74 is welded to the mixer body wall at a point to connect with the aluminum alkyl feed port 75, which opens into the terminus of the olefin feed zone 73 at right angles thereto, and the passage then immediately connects to expansion mixing chamber 76, which is approximately four times the diameter of the throat 79. A series of tubular openings, $77_1$, $77_3$ are provided to discharge liquid from the expansion chamber 76 to a final mixer section 78. The said tubular openings or conduit $77_1$, $77_3$ are mutually aligned to provide axes converging at a common point in a divergent section 80 of the final mixer section 78. A customary angle of divergence is 10 to 15 degrees. Immediately connected to the mixer section is the reactor section, which in this instance includes connecting segments 82, 84, and a central spool section 83. The first connecting section 82 is screwed to the terminal portion of the mixer 71, and the second connecting section or tail section 84 connects with a control valve in this particular embodiment, not shown.

As previously discussed, a particular feature of all embodiments of the process is that the mixing and the reactions are conducted under substantially adiabatic conditions, viz, with no heat or essentially no heat, being supplied to the mixing and reaction zones. Hence, in many instances, the mixer and reactor are covered with insulation to prevent undue loss of heat to the environment. It should be understood that the critical segment or feature of the requirement that the process be essentially adiabatic is that essentially no significant heat is to be applied to the mixture or reacting components by heated walls. Hence, when the apparatus is relatively large, so that radiation would account for only small losses of heat, insulation can be omitted, as the essential requirement of non-heated walls and adiabatic conditions will be essentially obtained. Analogously, when small apparatus is employed, some amount of heat can be supplied to the mixer and reactor walls as a substitute for insulation, merely to compensate for radiation to the environment, but not raising the temperature of the walls above or even to the average reaction temperature.

Having described the principles of the invention, the following working examples illustrate particular embodiments thereof.

EXAMPLE 1

In this operation, the apparatus employed was essentially as described in reference to FIGS. 1 and 2. In such embodiments, it will be noted that the reacted mixture passes across a control valve 43, wherein a substantial pressure reduction occurs. The mixture then passes through a quench heat exchanger 45 for further rapid cooling, prior to entry into the flash and disengaging drum 49.

In this run, the alkyl aluminum groups contained the relatively long chain length alkyl, and the olefin feed reactants were of relatively short chain length. The approximate weight compositions of the olefin and alkyl aluminum supplies provided in the storage drums 11, 31, respectively, were as tabulated below:

*Olefin feed*

| Olefin component: | Weight percent |
|---|---|
| Butene | 5 |
| Hexene | 24 |
| Octene | 39 |
| Decene | 31 |
| Dodecene | <1 |

The olefin stream contained minor amounts of paraffins of the indicated chain lengths, as impurities, amounting to less than 5 weight percent. Also, the stream contained minor quantities of internal olefins as impurities, to the extent of about 12 weight percent, also in the same chain length ranges.

The alkyl aluminum feed stream was a mixture having alkyl groups peaking at about the decyl group, and with substantial proportions of lower and higher alkyl aluminum groups. The composition of this stream is given by the following table, in terms of concentration of the alkyl aluminum moieties.

| Alkyl aluminum groups: | Weight percent |
|---|---|
| Butyl and lower | <10 |
| Hexyl | 13 |
| Octyl | 16 |
| Decyl | 17.5 |
| Dodecyl | 16 |
| Tetradecyl | 12 |
| Hexadecyl | 7 |
| Octadecyl and higher | <10 |

The alkyl aluminum stream included a small amount of olefins in the range of eight to twenty carbon atom species, to the extent of about 12 weight percent, of which about five weight percent were vinylidene isomers.

In operation, the olefin stream was raised in pressure by pump 13, to a pressure of over 700 p.s.i., and was passed through the heat exchangers 15, 19, to provide an olefin feed temperature, in line 22, of about 630° F.

The alkyl aluminum mixture, being similarly raised in pressure by pumps 33 to about 650 p.s.i., was warmed up by the heat exchanger 35 to a temperature of about 250° F., before being passed through line 38 to the mixer 41.

The proportions of the olefin feed to the aluminum alkyl were controlled by appropriate valves, not shown, to a ratio of about 7.5 moles of total vinyl olefins in the olefin supply stream, per total alkyl aluminum moieties in the alkyl aluminum feed. The average temperature of the mixed and reacting materials, in the reaction zone 42 was about 590° F. A total residence time in the mixer 41 and the reactor 42, was 0.3 second.

The pressure maintained in the mixer-reactor zones was about 600 p.s.i.g. A drastic pressure drop was achieved in passing the control valve 43, the downstream pressure being only about 10 p.s.i.g. This drastic pressure drop resulted in a temperature decrease of about 70° F. Immediately after passing the control valve 43, the stream passed to the heat exchanger 45, the residence time in the transfer line 44 being only a fraction of a second.

In the heat exchanger 45, the process stream was cooled with 80° F. cooling water to a temperature of about 290° F., the cooled stream being discharged through line 48 to the flash chamber 49. The flash chamber 49 provided disengaging space for the substantial quantity of vapor components formed as a result of the reduction in pressure already accomplished. The overhead vapors were discharged through line 50, and consisted essentially of the olefin components in the four to eight carbon atom range, the liquid bottoms stream being discharged through line 51. The composition of the alkyl aluminum components of the bottoms stream was as follows:

| Alkyl aluminum groups: | Weight percent |
|---|---|
| Butyl and lower | 12.4 |
| Hexyl | 19.4 |
| Octyl | 30.9 |
| Decyl | 26.0 |
| Dodecyl | 4.3 |
| Tetradecyl | 2.8 |
| Hexadecyl | 1.7 |
| Octadecyl and higher | 2.5 |

It will be noted that the operation resulted in a drastic increase in concentration of the alkyl groups of six to ten carbon atoms, from about 46 to 76 weight percent, or a weight concentration increase of about 60 percent in this fraction. Similarly, the weight concentration of alkyl groups of twelve or more carbon atoms was reduced from about 44 percent to about 11 weight percent. The foregoing operation did not result in any detectable increase in quantity of internal or branched chain olefins, so that the olefins released were of substantial equivalent quality, with respect to these impurities, as the feed olefin mixture. Similarly, the alkyl aluminum product was low in branched alkyl groups.

Operations corresponding to the foregoing example have been carried out for periods of several weeks running time with no evidence of decomposition of the alkyl aluminum components to release solid aluminum metal, despite the known tendency of these compounds to decompose at the operating temperatures employed.

In all instances wherein the displacement reaction is followed by a drastic pressure reduction across a control valve, the lower pressure should be below 100 pounds per square inch.

The precise ratio of olefins to alkyl groups is not critical, providing a substantial excess is provided. In the foregoing example, the ratio can be varied from about six to eight moles per alkyl group and substantially similar results will be obtained.

The above transalkylation effected the enrichment of the product alkyl aluminum stream with the lower-intermediate alkyl groups, hexyl through decyl, and the diminution of the higher alkyl group concentrations. The following example illustrates the reverse process, i.e., the enrichment of the alkyl groups in the higher components.

EXAMPLE 2

The general operating technique employed was the same as in Example 1, but somewhat different conditions were used and the reactant and product compositions differed. In this operation, the olefins were highly concentrated in dodecene through hexadecene components, whereas the trialkyl aluminum feed contained less than a 40 weight percent concentration of alkyl aluminum moieties having the 12 through 16 carbon atom range. The conditions and results of this run are summarized in the table below:

| | |
|---|---|
| Feed and reaction pressure | 200 to 300 p.s.i.g. |
| Temperature of preheated olefins | 640° F. |
| Reaction temperature | 577° F. |
| Mole ratio, vinyl olefins fed to alkyl groups | From 3 to 4:1. |

*Olefin feed*

| Component: | Weight percent |
|---|---|
| Decene | <1 |
| Dodecene | 54 |
| Tetradecene | 29 |
| Hexadecene | 15 |
| Octodecene | 1 |

ALKYL ALUMINUM GROUP DISTRIBUTION

| Alkyl Groups | Weight Percent | |
|---|---|---|
| | Feed Stream | Product Stream |
| Butyl | 3 | Trace |
| Hexyl | 8 | <1 |
| Octyl | 17 | 2 |
| Decyl | 22 | 6 |
| Dodecyl | 18 | 40 |
| Tetradecyl | 13 | 31 |
| Hexadecyl | 8 | 16 |
| Octadecyl | 6 | 4 |
| Eicosyl and higher | 5 | nil |

From the foregoing data, the profound enrichment of the product stream in twelve through sixteen carbon alkyl groups will be clear. The concentration of these alkyl groups was raised from 39 to 87 percent. The highly effective characteristic of the process is further shown by the substantial diminution of the very high alkyl groups in the feed stream, these being reduced from about 11 weight percent to about 4 weight percent. In other words, in this embodiment wherein the desired product is the 12 through 16 carbon atom alkyls, the concentrations of both lower-than-desired and higher-than-desired alkyl groups were drastically reduced.

EXAMPLE 3

In this operation, the procedure of Example 1 is repeated. However, instead of providing an indirect cooling of the effluent from the mixer and reactor sequence, after the pressure reduction by the control valve 43, a stream of relatively cold olefin hydrocarbon is added to the effluent. The addition is made by a mixing T, not shown, or a similar arrangement to assure immediate dilution and resultant temperature reduction. In this operation, the olefin stream thus admixed can correspond generally in composition to the olefins provided as a preheated stream to the transalkylation reaction.

The said cold olefin stream is provided at a rate of about one-fourth of the rate of the hot olefins applied in line 22. This mixing is followed by further cooling in the heat exchanger 45 to a temperature of below 300° F., before entering the flash chamber 49 for separation of the volatile olefin components from the heavier olefin and alkyl aluminum components. The alkyl aluminum components discharged through the bottoms line 51 have substantially the same composition as in Example 1.

If desired, the proportions of olefins can be substantially increased to reduce the heat exchange load in the exchanger 45. Generally, it is most economical to restrict the quantity of quench olefins to from about one-eighth to one-half of the feed olefins, and to provide supplemental indirect heat exchange for further cooling. It will also be understood that the olefins used as above for cooling purposes need not correspond in composition to the olefin mixture used as a reactant feed stream. However, such a stream is a highly preferable embodiment.

EXAMPLE 4

In this operation, essentially the same feed streams as employed in Example 2 are again used, and similar results are achieved in the displacement or transalkylation reaction. The reacted mixture, after passing through the control valve 43, is mixed with a recycled stream predominating in an oxidized mixture of trialkyl aluminum components, introduced by a line, not shown, to the transfer line 44. The alkyl groups of this stream correspond essentially to the alkyl groups of the effluent from the reactor 42, but are sufficiently oxidized so that sufficient alkoxide groups are provided to correspond to at least one alkoxide group per aluminum atom in the resultant mixture. In the present case, the recirculated oxidized alkyl aluminum stream corresponds in molal quantity to the alkyl aluminum components of the displacement reaction products, and is oxidized to the extent corresponding to the composition $RAl(OR)_2$, wherein R is an alkyl group. Upon mixing with the hot, alkyl aluminum containing reactor effluent, immediate cooling is obtained, and, in addition a redistribution of the alkyl and alkoxide groups occurs, viz.,

$$R_3Al + RAl(OR)_2 \rightarrow 2R_2AlOR$$

In this embodiment, the tendency of the olefins present to isomerize or to form vinylidene olefins is essentially negated by the combination of the cooling accomplished by the mixing described plus the conversion of the aluminum components present to the average composition of a dialkyl aluminum monoalkoxide. This redistribution reaction and treatment is extremely rapid, of the order of one or two seconds.

The so-treated mixture is then flashed and subjected to further vaporization to accomplish a high separation of olefin components from the alkyl aluminum components. It is found that, where the foregoing quenching is carried out with a high-alkoxide aluminum stream, that the subsequent flashing operation can be at an appreciably higher temperature, of up to 400 or even 450° F., and no degradation of the olefin components to internal or branched chain olefins will occur during the vaporizing operation. In contrast, when the displacement products are cooled only, or even mixed with cold olefins, as in Example 3, a lower temperature of the order of 300° F., and at least below 400° F., is desirable.

Instead of the alkyl aluminum dialkoxide used in the foregoing example, a smaller proportion, of aluminum trialkoxides, can be used.

EXAMPLE 5

In this operation the procedure is generally the same as in Example 1, but the trialkyl aluminum feed to the process is a mixture of trialkyl aluminum compounds in which about two-thirds of the alkyl aluminum groups are 2-methyl-1-pentyl aluminum, the rest being mostly propyl aluminum groups. The displacement olefin is ethylene, separately preheated to a temperature of about 600° F. The ethylene is supplied in proportions of about eight moles per alkyl group and the temperature of reaction in the reactor 42 is about 570° F. The operating pressure is about 150 p.s.i., and a total mixing and reaction time of about 0.5 second is used. The reacted product mixture is cooled immediately after discharge from the reaction zone by a drastic pressure drop across a control valve and by an efficient heat exchange, as in Example 1. A high conversion or transalkylation of the 2-methyl-1-pentyl aluminum groups to ethyl aluminum groups is obtained, releasing 2-methyl-1-pentene.

EXAMPLE 6

The procedure of Example 5 is repeated, except that the alkyl aluminum feed is an alkyl aluminum stream containing the following distribution of alkyl groups:

| Alkyl aluminum groups: | Mole percent |
| --- | --- |
| Ethyl (approx.) | 70 |
| n-Propyl | 18 |
| n-Butyl | 2 |
| 2-methyl-1-butyl | 6 |
| n-Hexyl | 4 |

The displacement of the 2-methyl-1-butyl, and of the n-hexyl groups, is substantially complete releasing the corresponding olefins and forming ethyl aluminum groups.

It will be apparent to one skilled in the art that the process of the present invention is applicable to a very large number of feed streams. As illustrated, the displacing olefin can be ethylene, or other relatively pure higher olefin, including illustratively, propene, 1-butene, 1-hexene, 1-decene, 1-dodecene, 1-tetradecene, and of course, mixtures of olefins relatively concentrated in groups of olefins. In Examples 1 to 4, the displacing olefins are mixtures of olefins having an even number of carbon atoms, but mixtures of olefins differing by only one carbon atom are similarly useful. Likewise, olefin mixtures whose components predominantly have odd numbers of carbon atoms can be used.

While it is not desired to be limited to any theoretical explanation of the benefits of the invention, in general the benefits are believed to result from several discoveries. Firstly, the introduction of heat to an alkyl aluminum reactant by conventional means, i.e., by heating through a heat exchange surface, invariably results in thermal decomposition of part of the trialkyl aluminum components. Hence, the provision of the necessary heat by preheating an excess of displacement olefins and conducting the reaction under substantially adiabatic conditions virtually eliminates the said undesirable hot wall effects. Secondly, it has been proved that the increase of reaction rate with temperature is profoundly greater for the desired transalkylation reactions than for the undesirable reactions which result in branched alkyl groups or vinylidene olefins and/or in positional isomerization of alpha olefins to internal olefins. The extremely rapid and intensive mixing of hot reacting olefins with the relatively cold trialkyl aluminum, and the termination of reaction by the cooling immediately after the very brief reaction period, substantially negate or minimize the amount of undesired side reaction which can occur.

Having described and illustrated the invention, what is claimed is:

1. The process for replacing alkyl groups of a trialkyl aluminum feed with different alkyl groups comprising
    (a) preheating an olefin feed stream to a temperature from about 400 to 700° F., the olefins being in molal excess of the alkyl groups of a trialkyl aluminum feed and predominantly of different chain length than said alkyl groups, and the olefins being preheated sufficiently to provide an adiabatic reaction temperature as hereafter defined,
    (b) mixing reacting said preheated olefins with the cold trialkyl aluminum feed under high intensity mixing conditions, for a time of about one-hundredth to one-half of the reaction time hereafter defined, and providing thereby a mixture temperature sufficient to cause rapid transalkylation of the alkyl groups by the olefins,
    (c) further reacting the mixture from (b) under substantially adiabatic reaction conditions at a temperature from about 300 to 650° F. and a pressure of about 100 to 800 pounds per square inch for a total mixing and reaction time of about 0.1 to 5 seconds and,
    (d) rapidly cooling the reacted mixture sufficiently to inhibit further reaction.

2. The process of claim 1 further defined in that
    the trialkyl aluminum feed predominates in decyl and higher alkyl aluminum groups,
    the olefins feed predominates in octene and lower olefins,
    the olefins feed is in a ratio of about six to eight moles per alkyl group of the trialkyl aluminum feed and is preheated to a temperature of at least about 600° F.,
    the temperature of adiabatic reaction is from about 500 to 600° F., the pressure is from about 500 to 600 pounds per square inch and the total residence time in the mixing and reaction is from about 0.2 to 0.5 second.

3. The process of claim 2 further defined in that the reacted mixture is cooled by a reduction in pressure to below about 100 pounds per square inch and then further cooling by indirect heat exchange.

4. The process of claim 2 further defined in that the reacted mixture is cooled by
    a reduction in pressure to below about 100 pounds per square inch,
    admixing with the reacted mixture a stream of inert liquid hydrocarbons in proportions of about one-eighth to one-half of the olefin feed stream, and indirect heat exchange,
    the temperature of this cooled stream being below about 400° F.

5. The process of claim 1 further defined in that
    the trialkyl aluminum feed predominates in decyl and lower alkyl aluminum groups,
    the olefins feed predominates in dodecene and higher olefins,
    the olefins feed is in a ratio of about three to four moles per alkyl aluminum group and is preheated to a temperature of at least about 600° F.,
    the temperature of adiabatic reaction is from about 500 to 600° F., the pressure is from about 200 to 300 pounds per square inch, and the total residence time in the mixing and reaction is from about 0.2 to 0.5 second.

6. The process of claim 5 further defined in that the reaction is essentially terminated by
    a reduction in pressure to below about 100 pounds per square inch, and
    admixing with the reacted mixture an aluminum alkoxide containing stream having sufficient alkoxide groups to provide at least one alkoxide group per atom of aluminum in the so formed mixture.

7. The process of claim 1 wherein the adiabatic reaction conditions include a temperature from about 500 to about 650° F.

8. The process of claim 1 further defined in that
    the trialkyl aluminum feed predominates in decyl and higher alkyl aluminum groups,
    the olefins feed predominates in octene and lower olefins,
    the olefins feed is in a ratio of about six to eight moles per alkyl group of the trialkyl aluminum feed and is preheated to a temperature from about 600 to 700° F.,
    the temperature of adiabatic reaction is from about 500 to 650° F., the pressure is from about 500 to 800 pounds per square inch and the total residence time in the mixing and reaction is from about 0.1 to 0.5 second.

9. The process of claim 1 further defined in that
    the trialkyl aluminum feed predominates in decyl and lower alkyl aluminum groups,
    the olefins feed predominates in dodecene and higher olefins,
    the olefins feed is in a ratio of about three to four moles per alkyl aluminum group and is preheated to a temperature from about 600 to 700° F.,
    the temperature of adiabatic reaction is from about 300 to 650° F., the pressure is from about 100 to 800 pounds per square inch, and the total residence time in the mixing and reaction is from about 0.1 to 0.5 second.

References Cited

UNITED STATES PATENTS 3,180,881 4/1965 Zosel et al. _____ 260—448
3,210,435 10/1965 Kennedy et al.

TOBIAS E. LEVOW, *Primary Examiner.*

H. M. S. SNEED, *Assistant Examiner.*